(12) United States Patent
Wang

(10) Patent No.: US 7,545,564 B2
(45) Date of Patent: Jun. 9, 2009

(54) UNIVERSAL BROADBAND POLARIZER, DEVICES INCORPORATING SAME, AND METHOD OF MAKING SAME

(75) Inventor: Jian Wang, Orefield, PA (US)

(73) Assignee: API Nanofabrication and Research Corporation, Somerset, NJ (US)

( * ) Notice: Subject to any disclaimer, the term of this patent is extended or adjusted under 35 U.S.C. 154(b) by 0 days.

(21) Appl. No.: 11/832,276

(22) Filed: Aug. 1, 2007

(65) Prior Publication Data

US 2007/0297053 A1    Dec. 27, 2007

Related U.S. Application Data

(60) Division of application No. 10/775,356, filed on Feb. 10, 2004, now Pat. No. 7,268,946, which is a continuation-in-part of application No. 10/644,643, filed on Aug. 20, 2003, now Pat. No. 7,227,684.

(60) Provisional application No. 60/446,200, filed on Feb. 10, 2003.

(51) Int. Cl.
    *G02B 5/30* (2006.01)
(52) U.S. Cl. ........................ 359/486; 359/352
(58) Field of Classification Search ................. 359/486
    See application file for complete search history.

(56) References Cited

U.S. PATENT DOCUMENTS

| 4,615,034 A | 9/1986 | Von Gunten et al. |
| 4,638,669 A | 1/1987 | Chou |
| 4,650,289 A | 3/1987 | Kuwahara |
| 4,732,444 A | 3/1988 | Papuchon et al. |
| 4,763,972 A | 8/1988 | Papuchon et al. |
| 4,778,234 A | 10/1988 | Papuchon et al. |
| 4,998,793 A | 3/1991 | Henry et al. |
| 5,077,816 A | 12/1991 | Glomb et al. |
| 5,088,105 A | 2/1992 | Scifres et al. |
| 5,091,981 A | 2/1992 | Cunningham |
| 5,245,471 A | 9/1993 | Iwatsuka et al. |
| 5,283,845 A | 2/1994 | Ip |
| 5,299,212 A | 3/1994 | Koch et al. |
| 5,461,246 A | 10/1995 | Chou |
| 5,467,415 A | 11/1995 | Presby |
| RE35,337 E | 9/1996 | Patel et al. |
| 5,617,234 A | 4/1997 | Koga et al. |

(Continued)

FOREIGN PATENT DOCUMENTS

JP    61 159602    7/1986

OTHER PUBLICATIONS

European Search Report Mar. 5, 2008.

*Primary Examiner*—Arnel C Lavarias
*Assistant Examiner*—Derek S Chapel
(74) *Attorney, Agent, or Firm*—Fish & Richardson P.C.

(57) ABSTRACT

A polarization dependent device suitable for effecting at least one polarization of a broadband portion of electromagnetic radiation incident upon the device includes a substrate, and a plurality of regions of differing refractive indices positioned in an alternating manner and substantially adjacent to the substrate to effect the at least one polarization impinging on the regions. The plurality of regions are oriented with respect to the at least one polarization of the broadband portion of the electromagnetic radiation so as to effect the at least one polarization of the broadband portion of the electromagnetic radiation impinging on the regions.

18 Claims, 7 Drawing Sheets

U.S. PATENT DOCUMENTS

| | | | |
|---|---|---|---|
| 5,654,818 A | 8/1997 | Yao | |
| 5,691,989 A | 11/1997 | Rakuljic et al. | |
| 5,706,301 A | 1/1998 | Lagerstrom | |
| 5,719,976 A | 2/1998 | Henry et al. | |
| 5,726,805 A | 3/1998 | Kaushik et al. | |
| 5,772,905 A | 6/1998 | Chou | |
| 5,777,793 A | 7/1998 | Little et al. | |
| 5,793,784 A | 8/1998 | Wagshul et al. | |
| 5,820,769 A | 10/1998 | Chou | |
| 5,848,080 A | 12/1998 | Dahm | |
| 5,852,688 A | 12/1998 | Brinkman et al. | |
| 5,870,421 A | 2/1999 | Dahm | |
| 5,956,216 A | 9/1999 | Chou | |
| 5,966,483 A | 10/1999 | Chowdhury | |
| 5,973,316 A | 10/1999 | Ebbesen et al. | |
| 5,973,784 A | 10/1999 | Szwaykowski et al. | |
| 5,991,075 A * | 11/1999 | Katsuragawa et al. | 359/486 |
| 6,035,089 A | 3/2000 | Grann et al. | |
| 6,037,644 A | 3/2000 | Daghighian et al. | |
| 6,040,936 A | 3/2000 | Kim et al. | |
| 6,052,238 A | 4/2000 | Ebbesen et al. | |
| 6,064,506 A | 5/2000 | Koors | |
| 6,069,380 A | 5/2000 | Chou et al. | |
| 6,075,915 A | 6/2000 | Koops et al. | |
| 6,101,300 A | 8/2000 | Fan et al. | |
| 6,122,103 A | 9/2000 | Perkins et al. | |
| 6,122,301 A | 9/2000 | Tei et al. | |
| 6,125,220 A | 9/2000 | Copner et al. | |
| 6,127,939 A | 10/2000 | Lesesky et al. | |
| 6,130,969 A | 10/2000 | Villeneuve et al. | |
| 6,154,318 A | 11/2000 | Austin et al. | |
| 6,154,479 A | 11/2000 | Yoshikawa et al. | |
| 6,169,825 B1 | 1/2001 | Morey et al. | |
| 6,175,667 B1 | 1/2001 | Wang et al. | |
| 6,191,890 B1 | 2/2001 | Baets et al. | |
| 6,198,557 B1 | 3/2001 | Dultz et al. | |
| 6,198,860 B1 | 3/2001 | Johnson et al. | |
| 6,208,463 B1 | 3/2001 | Hansen et al. | |
| 6,215,928 B1 | 4/2001 | Friesem et al. | |
| 6,233,375 B1 | 5/2001 | Lang et al. | |
| 6,233,380 B1 | 5/2001 | Ferrieu | |
| 6,235,141 B1 | 5/2001 | Feldman et al. | |
| 6,240,109 B1 | 5/2001 | Shieh | |
| 6,251,297 B1 | 6/2001 | Komuro et al. | |
| 6,252,709 B1 | 6/2001 | Sato | |
| 6,253,009 B1 | 6/2001 | Lestra et al. | |
| 6,260,388 B1 | 7/2001 | Borrelli et al. | |
| 6,262,002 B1 | 7/2001 | Carey | |
| 6,263,002 B1 | 7/2001 | Hsu et al. | |
| 6,275,291 B1 | 8/2001 | Abraham et al. | |
| 6,285,810 B1 | 9/2001 | Fincato et al. | |
| 6,288,840 B1 | 9/2001 | Perkins et al. | |
| 6,309,580 B1 | 10/2001 | Chou | |
| 6,317,554 B1 | 11/2001 | Kosaka et al. | |
| 6,324,192 B1 | 11/2001 | Tayebati | |
| 6,339,603 B1 | 1/2002 | Flanders et al. | |
| 6,349,103 B1 | 2/2002 | Chung et al. | |
| 6,353,623 B1 | 3/2002 | Munks et al. | |
| 6,359,915 B1 | 3/2002 | Koch et al. | |
| 6,370,177 B1 | 4/2002 | Genei et al. | |
| 6,371,662 B1 | 4/2002 | Leard et al. | |
| 6,374,016 B2 | 4/2002 | Albert et al. | |
| 6,400,860 B1 | 6/2002 | Chandrasekhar et al. | |
| 6,410,416 B1 | 6/2002 | Dodabalapur et al. | |
| 6,482,742 B1 | 11/2002 | Chou | |
| 6,518,189 B1 | 2/2003 | Chou | |
| 6,618,104 B1 | 9/2003 | Date et al. | |
| 6,661,952 B2 | 12/2003 | Simpson et al. | |
| 6,665,119 B1 * | 12/2003 | Kurtz et al. | 359/486 |
| 6,692,797 B1 | 2/2004 | Owen et al. | |
| 6,713,238 B1 | 3/2004 | Chou et al. | |
| 6,813,077 B2 | 11/2004 | Borrelli et al. | |
| 7,113,335 B2 | 9/2006 | Sales | |
| 2002/0191880 A1 | 12/2002 | Borrelli | |
| 2003/0007251 A1 | 1/2003 | Imaizumi et al. | |

* cited by examiner

UNIVERSAL BROADBAND POLARIZER, DEVICES INCORPORATING SAME, AND METHOD OF MAKING SAME

CROSS-REFERENCE TO RELATED APPLICATIONS

This application is a divisional application of Ser. No. 10/775,356, filed Feb. 10, 2004 now U.S. Pat. No. 7,268,946, which is a continuation-in-part application of Ser. No. 10/644,643 filed Aug. 20, 2003, now U.S. Pat. No. 7,227,684, which claims priority of provisional application Ser. No. 60/446,200 filed Feb. 10, 2003, the entire disclosure of which are hereby incorporated by reference.

FIELD OF THE INVENTION

The present invention relates generally to optical components being suitable for broadband polarizing and more particularly, for polarizing, combining and beam splitting.

BACKGROUND OF THE INVENTION

Propagating electromagnetic radiation is composed of two orthogonally polarized components—known as the transverse electric and transverse magnetic fields. In many applications, it is necessary or desired to separately control the transverse electric (TE) or the transverse magnetic (TM) polarization. Device performance which varies based on polarization state may be important in optoelectronics, thereby allowing the possibility of multi-functioning devices. Birefringence is a property of a material to divide electromagnetic radiation into these two components, and may be found in materials which have two different indices of refraction, referred to as n⊥ and n∥ (or $n_p$ and $n_s$), in different directions, often orthogonal, (i.e., light entering certain transparent materials, such as calcite, splits into two beams which travel at different speeds). Birefringence is also known as double refraction. Birefringence may serve to provide the capability of separating these two orthogonal polarization, thereby allowing such devices to manipulate each polarization independently. For example, polarization may be used to provide add/drop capabilities, beamsplit incoming radiation, filter, etc.

However, a need therefore exists for devices in which polarization of traversing and incident electromagnetic spectrum may be controlled over a broad spectral range, thereby providing broadband polarization control.

SUMMARY OF THE INVENTION

A polarization dependent device suitable for effecting at least one polarization of a broadband portion of electromagnetic radiation incident upon the device is disclosed. This device includes a substrate, and a plurality of regions of differing refractive indices positioned in an alternating manner and substantially adjacent to the substrate to effect the at least one polarization impinging on the regions. The plurality of regions are oriented with respect to the at least one polarization of the broadband portion of the electromagnetic radiation so as to effect the at least one polarization of the broadband portion of the electromagnetic radiation impinging on the regions.

BRIEF DESCRIPTION OF THE FIGURES

Understanding of the present invention will be facilitated by consideration of the following detailed description of the preferred embodiments of the present invention taken in conjunction with the accompanying drawings, in which like numerals refer to like parts, and.

DETAILED DESCRIPTION OF THE PREFERRED EMBODIMENTS

It is to be understood that the figures and descriptions of the present invention have been simplified to illustrate elements that are relevant for a clear understanding of the present invention, while eliminating, for the purpose of clarity, many other elements found in typical photonic components and methods of manufacturing the same. Those of ordinary skill in the art will recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

In general, according to an aspect of the present invention, control of polarization may be used to control electromagnetic waves. Use of polarization to control electromagnetic waves may reduce negative wavelength dependent effects often associated with wavelength control techniques, such as transmission roll-offs, non-uniformity of transmission, and transmission variation with respect to wavelength. Such polarization control may be effected using sub-operating wavelength optical structures, such as nanostructures or nanoelements, where the operating wavelength corresponds to the electromagnetic waves. Such polarization control over a broadband of wavelengths, such as visible and infrared, for example, adds to the usefulness of the control. Further, broadband may be defined to include a subset of the visible spectrum and a subset of the infrared spectrum, such as wavelengths from 300-1000 nm, 500-1100 nm, and 550-1000 nm, by way of non-limiting example only. Further, broadband may be defined to include multiple communication channels, such as 1000-1200 nm, by way of non-limiting example only. Further, broadband may be defined to include substantial portions of either the visible spectrum or infrared spectrum, or both, as would be conventionally understood by those having an ordinary skill in the pertinent arts.

Figure 1:
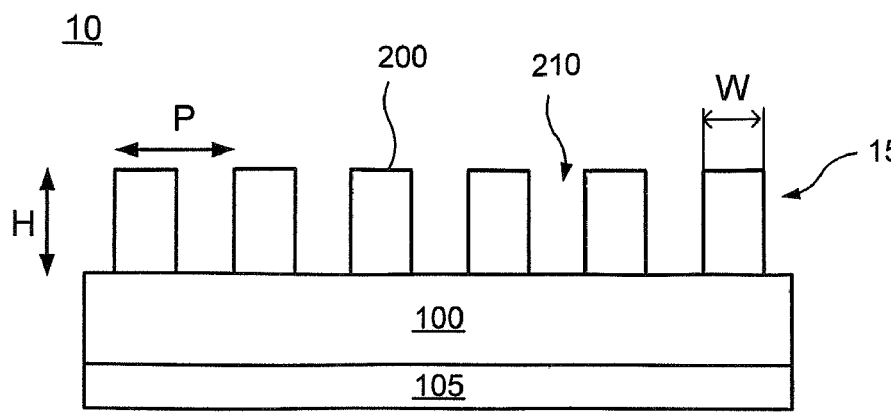
FIG. 1 illustrates a cross section of the present device according to an aspect of the present invention.

Referring now to FIG. 1, there is shown a device 10 according to an aspect of the present invention. Device 10 may generally include a substrate 100 and a pattern of nanostructures 150 positioned substantially adjacent to substrate 100.

Pattern of nanostructures 150 may include a plurality of regions 200 and 210 of differing refractive indices positioned in an alternating manner. Device 10 may also include a layer 105 positioned substantially adjacent to substrate 100 distal to pattern of nanostructures 150.

Substrate 100 may take the form of any material suitable for use in optics and known by those possessing ordinary skill in the pertinent arts. Suitable materials for substrate 100 may include materials commonly used in the art of grating or optic manufacturing, such as glass (like BK7, Quartz or Zerodur, for example), semiconductors, Faraday magnetic-optic materials, such as garnets, and materials including elements such as bismuth, iron, gallium, and oxygen, for example, and polymers including plastics such as polycarbonate, by way of non-limiting example only. Further, substrate 100 may include a composite substrate having multiple layers incorporating such materials. Substrate 100 may be any thickness, such as a thickness within the range of 1-10,000 µm, for example. More specifically substrate 100 may have a thickness of approximately 1000 µm, 500 µm, 200 µm, 100 µm, 50 µm, 20 µm, 5 µm, by way of non-limiting example only.

Pattern of nanostructures 150 may include a plurality of regions oriented with respect to the at least one polarization of the broadband portion of the electromagnetic radiation so as to effect the at least one polarization of the broadband portion of the electromagnetic radiation impinging on the regions.

Pattern of nanostructures 150, including nanoelements or sub-wavelength elements, may include multiple elements each of width W and height H. Width W may be from about 10 to 500 nm or from about 15 to 180 nm. Height H may be between about 10 to 1000 nm, or about 30 to 500 nm. Further, the dimensions of the elements may vary, be chirped, or be tapered as will be understood by those possessing an ordinary skill in the pertinent arts.

Pattern of nanostructures 150 may have a period of nanoelements, P. This period may also be substantially constant or varied or chirped. Period P may be between about 10 nm and 1000 nm, or 30 nm and 200 nm. As may be seen in FIG. 1, nanostructures 150 may form areas of alternating refractive indices. In FIG. 1, for example, a first index material 200, having a refractive index $n_F$, may be positioned substantially adjacent to a second index material 210, having a refractive index $n_O$, creating alternating regions of relatively high and low indices, respectively. The filling ratio of pattern of nanostructures 150, denoted W/P, may be defined as the ratio of the width of the index area of the higher of the two refractive index elements within the period to the overall period. Filling ratio, W/P, may determine an operating wavelength of the device as will be understood by to one possessing an ordinary skill in the pertinent arts.

First index material 200 may take the form of conductive materials known to those possessing an ordinary skill in the pertinent arts, such as aluminum, gold, silver, copper, and alloys of these materials, by way of non-limiting example only. Second index material 210 may take the form of air, a vacuum, or a dielectric material such as silicon dioxide, metal oxide, metal fluoride, organic polymer containing hydrocarbon, inorganic liquid, organic liquid, or glass, by way of non-limiting example only. According to an aspect of the present invention first index material 200 may have a higher refractive index than second index material 210. For completeness, there may be multiple materials 210, 200, each occupying a portion of overall period P. This portion may be functionally represented as:

$$f_k = \frac{F_{Gk}}{X_G}; \text{ for } k = 1, 2, 3, \ldots, M; \text{ and } \sum_{k=1}^{M} f_k = 1$$

where the characteristic dimension P is less than the operating wavelength of the device, such as, for example, an operating wavelength λ=1550 nm and P on the order of 10 to 1000 nm, and more specifically from 30 to 200 nm.

Pattern of nanostructures 150 may be grown or deposited on substrate 100. Pattern of nanostructures 150 may be formed into or onto substrate 100 using any suitable nano-lithography and/or nano-replicating process, such as Sub-Micron-Scale patterning as described in U.S. Ser. No. 60/496,193. Other processes for producing pattern of nanostructures 150 include interference lithography such as holographic lithography, step and flash imprint lithography, nanoimprint lithography, soft lithography, deep UV (DUV) photolithography, extreme UV (EUV) lithography, X-ray lithography, E-beam lithography, ion-beam lithography and laser assisted direct imprint, by way of non-limiting example only.

According to an aspect of the present invention, an underlying one-dimensional (1-D) pattern of nanostructures 150, of materials of high contrast refractive index, forming high and low refractive index areas with distinct differences in refractive index, may be so formed on substrate 100. According to an aspect of the present invention, two-dimensional (2-D) pattern of nanostructures 150, formed of materials of high contrast refractive index may be so formed on substrate 100.

As will be recognized by those possessing ordinary skill in the pertinent arts, various elements in pattern 150 may be replicated in such a manner onto or into substrate 100. Such elements may take the form of strips, trenches, pillars, or holes, for example, all of which may have a common period or not, and may be of various heights and widths. Strips may take the form of rectangular grooves, for example, or alternatively triangular or semicircular grooves, by way of non-limiting example. Similarly pillars, basically the inverse of holes, may be patterned. Such pillars may be patterned with a common period in either axis or alternatively by varying the period in one or both axes. The pillars may be shaped in the form of, for example, elevated steps, rounded semi-circles, or triangles. The pillars may also be shaped with one conic in one axis and another conic in another, for example.

Layer 105 may be included within device 10 to provide or enhance optical operability of device 10. This layer, if present, may take the form of an anti-reflection coating, for example. For the sake of completeness, layer 105 may include multiple layers, such as a plurality of layers, which collectively, perform an anti-reflection function. In such a configuration, layer 105 may include alternating layers of $SiO_2$ and $HFO_2$, each layer having a thickness ranging from 20 nm to 200 nm. A total of four layers may be used. Other numbers of layers may also be used, as would be evident to those possessing an ordinary skill in the pertinent arts.

As is known to those possessing an ordinary skill in the pertinent arts, an anti-reflection coating (ARC) may take the form of a thin, dielectric or metallic film, or several such films, applied to an optical surface to reduce its reflectance and thereby increase the overall transmittance. A single quarter-wavelength coating of optimum index may eliminate reflection at one wavelength. Multi-layer coatings may reduce the loss over the visible spectrum. The idea behind anti-reflection coatings is that the creation of a double interface by means of a thin film gives you two reflected waves. If these waves are out of phase, they partially or totally cancel. If the coating is a quarter wavelength thickness and the coating has an index of refraction less that the glass it is coating then the two reflections are 180 degrees out of phase. If the first surface reflection resulting from radiation incident on the first surface of an ARC is 4% of the overall radiation impinging on device 10 and the second reflection resulting from radiation incident on the second surface of an ARC is 4% of the radiation transmitted by the coating layer (or 96% of the impinging radiation in this example) and 180 degrees out of phase near cancellation will result as will be apparent to those possessing an ordinary skill in the pertinent arts. In this example, the first reflection is 4% of the impinging radiation and the second reflection is 4% of 96% of the impinging radiation with each reflection out of phase by 180 degrees. If numerically these were equal no reflection would exist as each reflection would be totally canceled. In reality, a small reflection may still exist as 4% and 3.84% (96% of 4%) are not exactly equal. Nonetheless, the ARC has worked to reduce the reflection from 4% to 0.16% in this example.

Such a device, configured as described hereinabove, may provide an extinction ratio greater than approximately 100 in transmission over a wavelength range of 390 nm to 1600 nm, for example, and may have a transmittance greater than 0.50 over a wavelength range of 390 nm to 1600 nm, for example.

Figure 2A:
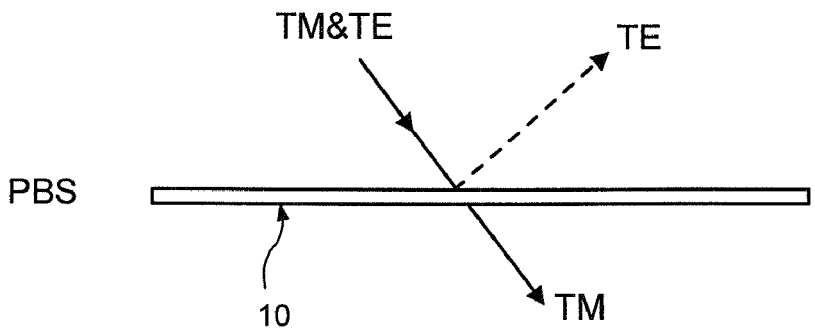
FIGS. 2A-2C each illustrate the operation of the device of FIG. 1 according to aspects of the present invention.
Figure 2B:
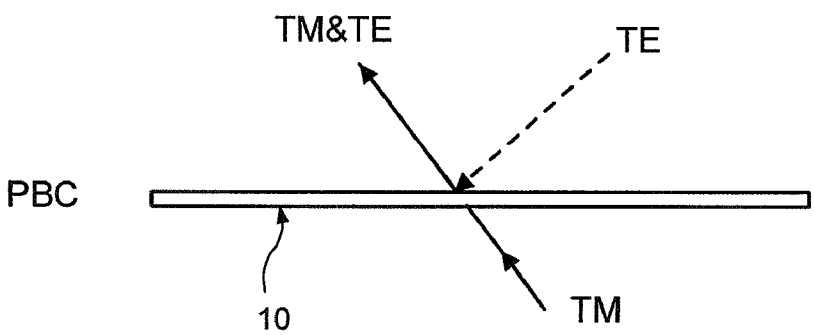
Figure 2C:
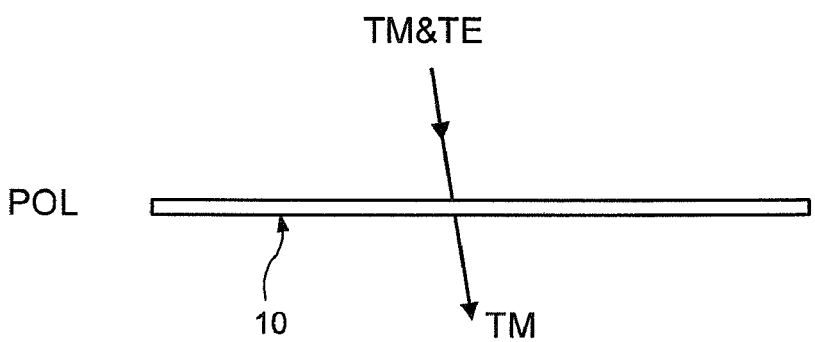

Referring now to FIGS. 2A-2C, there are shown a set of schematic diagrams illustrating operation of device 10 of FIG. 1 according to an aspect of the present invention. In FIG. 2A, there is shown the operation of a polarizing beam splitter according to an aspect of the present invention. As may be seen in FIG. 2A, radiation containing both TE and TM components may be incident upon device 10. One of the two components may be transmitted through device 10, shown in FIG. 2A as TM for example. The other component may be reflected by device 10, shown in FIG. 2A as TE for example. As is known to those possessing an ordinary skill in the pertinent arts, a polarizing beam splitter utilizing parallel conductors, such as nanostructure 150, may serve to transmit polarized radiation perpendicular to the length of the conductors and analogously, reflect radiation parallel to the length of the conductors.

Such a polarizer may be used for beam splitting, combining, polarization, or like-functions, and may be formed of a series of nanostructures. Wherein radiation, such as visible or infrared light, strikes the nanostructure, some of that radiation is reflected, while that portion of the radiation that is selectively polarized by the nanostructure may pass. Such a nanostructure polarizer polarizes the radiation wave incident on the parallel conductors perpendicularly to the length of the conductors.

The nanostructure may be dense and may be closer together than the wavelength of the radiation to be polarized, controlled, or analyzed. Thus, the smaller the wavelength of the radiation, the more dense the nanostructure may be in order to operate on the subject radiation. This has been, as is known in the art, a limitation on the types of radiation that may be polarized using such a polarizer. The polarization of radiation may be used to control the radiation that is the subject of the polarization, such as in a splitter or combiner, and to analyze the polarization characteristics of an object, such as by examining the light reflected from, or by, an object. Polarization characteristics may provide for extraction of significant information about the physical and chemical makeup of an object and of a surface. A polarizing beam splitter may thus act as an analyzer, for example, reflecting unwanted light, and passing desired light. Exemplary optical and electro-optical polarizer applications may include lasers, glare-reduction, lens coating, display enhancement, and exploitation of limited bandwidth availability, to name a few. For example, through "frequency reuse," an antenna may simultaneously transmit adjacent beams at a same frequency, and, by polarizing each beam differently, nonetheless maintain useful beam isolation. In the fields of optics, telecommunications, optical and electro-optical applications and photonics, it may be highly desirable to enhance device performance and reduce fabrication, packaging and assembly costs, such as by providing polarization capabilities that provide improved performance through a broader range of radiation, but that may be fabricated at low cost. For example, it may be desirable to provide a improved photonic component, which may be incorporated into a Photonic Integrated Circuit (PIC), or with another photonic device.

In FIG. 2B, there is shown the operation of a polarizing beam combiner according to an aspect of the present invention. As may be seen in FIG. 2B, radiation primarily oriented with one component (shown as TE in FIG. 2B) may be incident on one side of device 10. The other component of radiation (shown as TM in FIG. 2B) may be incident on a different surface of device 10. Device 10, configured according to an aspect of the present invention, may reflect the TE component while transmitting the TM component. Since these components were incident on opposite sides of device 10, the different reaction characteristics of device 10 serve to combine these two components in one beam, as is shown in FIG. 2B. A polarizing beam combiner utilizing parallel conductors, such as nanostructure 150, transmits polarized radiation perpendicular to the length of the conductors and similarly, reflects radiation parallel to the length of the conductors.

In FIG. 2C, there is shown the operation of a polarizer according to an aspect of the present invention. As may be seen in FIG. 2C, radiation containing both TE and TM components may be incident upon device 10. One of the components is transmitted by device 10 (shown as TM in FIG. 2C), while the other (shown as TE in FIG. 2C) is absorbed in device 10. As is known to those possessing an ordinary skill in the pertinent arts, a polarizer utilizing parallel conductors, such as nanostructure 150, transmits polarized radiation perpendicular to the length of the conductors.

Figure 3:
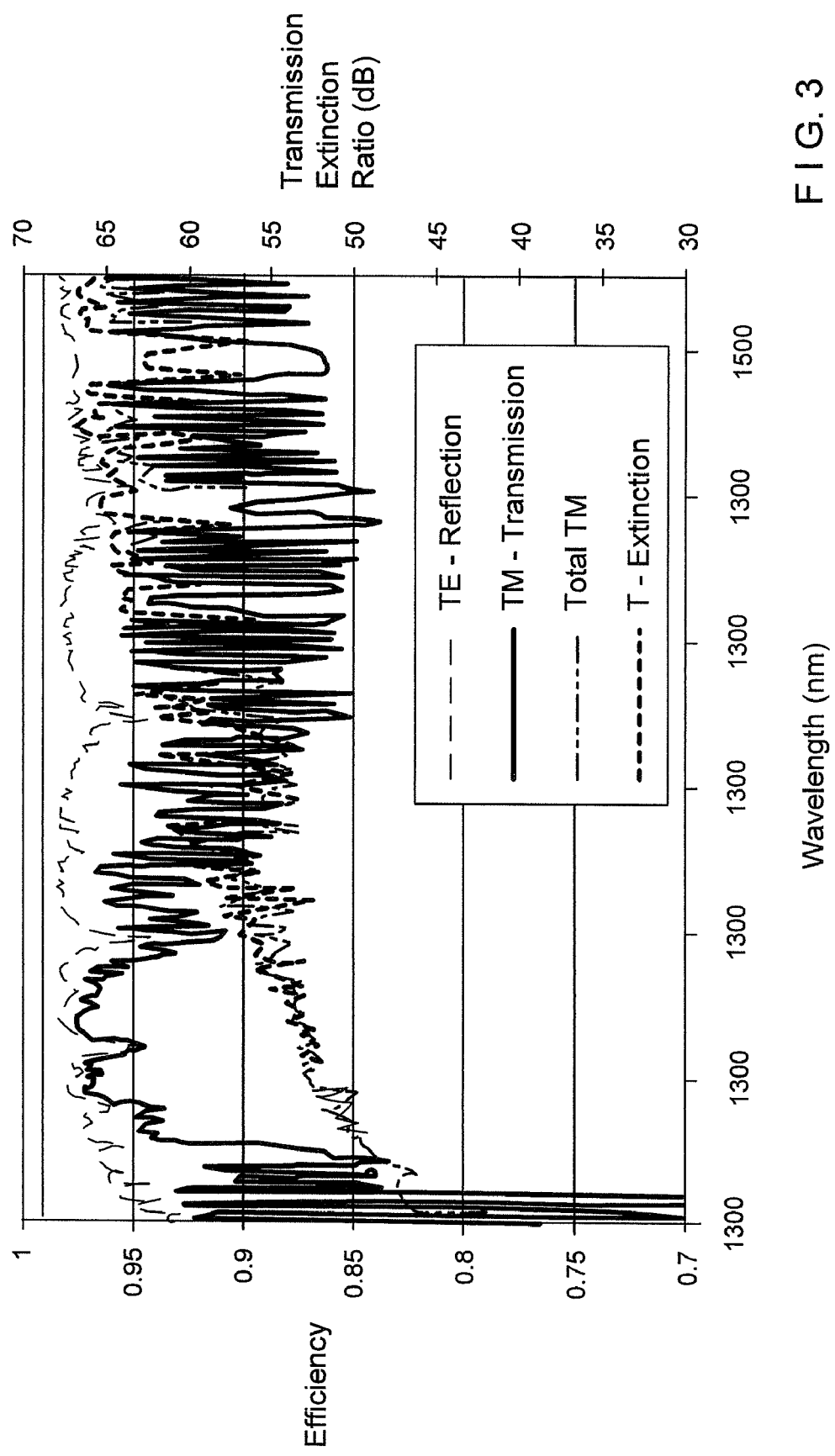
FIG. 3 illustrates a simulation of the resultant reflection and transmission of the device of FIG. 1 with respect polarization of the beam.

Referring now to FIG. 3, there is shown a simulation of the resultant reflection and transmission of device 10 of FIG. 1 with respect to the polarization of the beam. Specifically, the parameters of device 10 include aluminum nano-gratings with a period (P) of 100 mm, a height (H) of 150 nm, and a width (W) of 50 nm. In this simulation is incident on device 10 at approximately 45 degrees. As may be seen in FIG. 3, the component transmission TM is achieved above 83% for wavelengths between 350 and 1600 nm. The component reflected TE is greater than 98% for wavelengths between 300 and 1600 nm. Further, for transmitted beam, an extinction ratio is better than 40 dB for such a broadband window.

Figure 4:
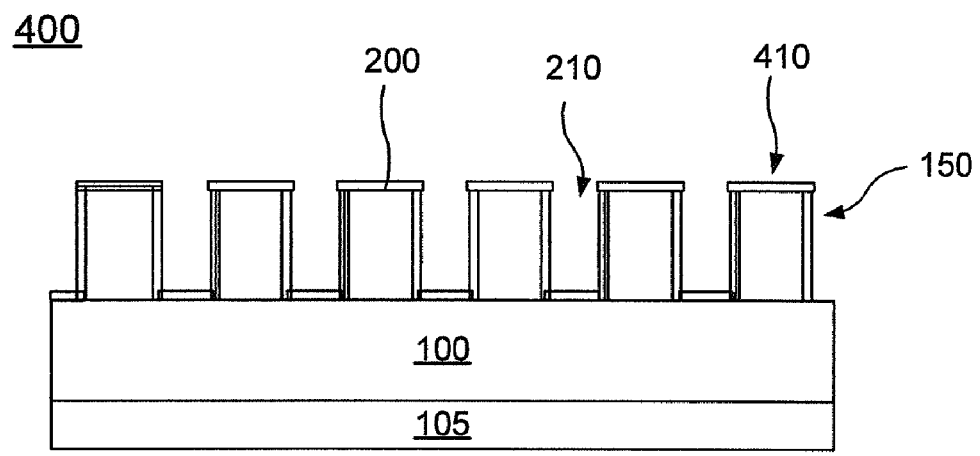
FIG. 4 illustrates a cross section of a device according to an aspect of the present invention.

Referring now to FIG. 4, there is shown a cross section of a device according to an aspect of the present invention. As may be seen in FIG. 4, a device 400 is shown. Device 400 may include many of the elements found in device 10, such as a substrate 100, a layer 105, a plurality of nanoelements 150 including a first index material 200, having a refractive index $n_F$, positioned substantially adjacent to a second index material 210, having a refractive index $n_O$, creating an alternating regions of relatively high and low indices, respectfully. Device 400 additionally may have dielectric layer 410. Dielectric layer 410 may be a dielectric material forming a thin film layer on at least one surface of device 400. This dielectric layer may take the form of silicon dioxide, for example. Dielectric layer 410 may be positioned substantially about the device or substantially along one edge, as shown in FIG. 4. This wrapping of dielectric layer 410 may improve the reliability of the device 410. Dielectric layer 410 may have a thickness in the range of 1 nm to 50 nm and may include silicon dioxide, organic polymer, silicon nitride, silicon oxynitride, magnesium fluoride and metal oxide.

Figure 5:
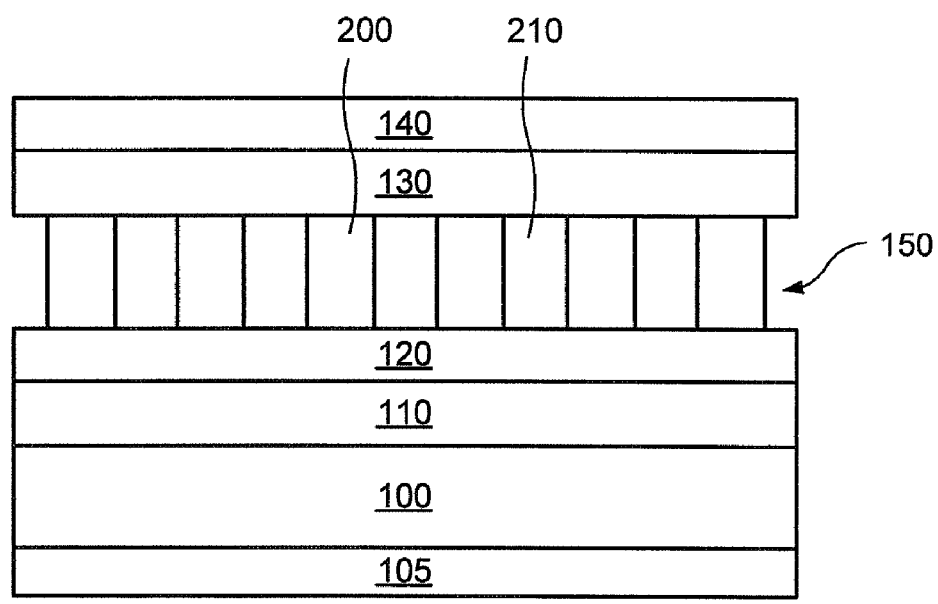
FIG. 5 illustrates a cross section of a device according to an aspect of the present invention.

Referring now to FIG. 5, there is shown a cross section of a device 500 according to an aspect of the present invention. Device 500 may include a substrate 100, anti-reflection coatings 105, 110, and 140, thin films 120 and 130 and nanograting 150. As is shown in FIG. 5, each of these layers may be aligned substantially adjacent to the preceding layer in sandwiched configuration similar to that described hereinabove. Substrate 100 may have anti-reflection coating 105 placed substantially adjacent thereto. Distal to anti-reflection coating 105 on substrate 100 may be placed anti-reflection coating 110. Substantially adjacent to coating 110 and distal to substrate 100 may be placed a thin film 120. Substantially adjacent to thin film 120 may be nanograting 150 aligned substantially adjacent not distal to thin film 120.

Substrate 100, as discussed hereinabove with respect to FIG. 1, may take the form of any material suitable for use in optics and known by those possessing ordinary skill in the pertinent arts.

Pattern of nanostructures 150, as discussed hereinabove with respect to FIG. 1, including nanoelements or sub-wavelength elements, may include multiple elements each of width W and height H. The dimensions of the elements may vary or be chirped as will be understood by those possessing an ordinary skill in the pertinent arts. Pattern of nanostructures 150 may have a period of nanoelements, P. This period may also be varied or chirped. As will be recognized by those possessing ordinary skill in the pertinent arts, various patterns may be replicated in such a manner onto or into substrate 100.

Anti-reflection coatings 105, 110 and 140 may be included within device 500. For the sake of completeness, coatings 105, 110 and 140 may include multiple layers designed to perform the anti-reflection function. While multiple layers may be, and commonly are, used the present discussion refers to layer 105 for a single or multiple layer performing the identified function.

As is known to those possessing an ordinary skill in the pertinent arts, an anti-reflection coating (ARC), such as anti-reflection coating 105, 110, and 140 may take the form of a thin, dielectric or metallic film, or several such films, applied to an optical surface to reduce its reflectance and thereby increase the overall transmittance.

Thin films 120, 130 may be utilized to provide an etch stop during processing, for example. If utilized as an etch stop, films 120 and 130 may be designed to incorporate the properties known to those possessing an ordinary skill in the pertinent arts with respect to semiconductor fabrication. In particular, thin films 120 and 130 may be designed with a material having a different etch rate than the material to be etched and may be placed underneath the etched layer to provide a buffer during etching.

Figure 6:
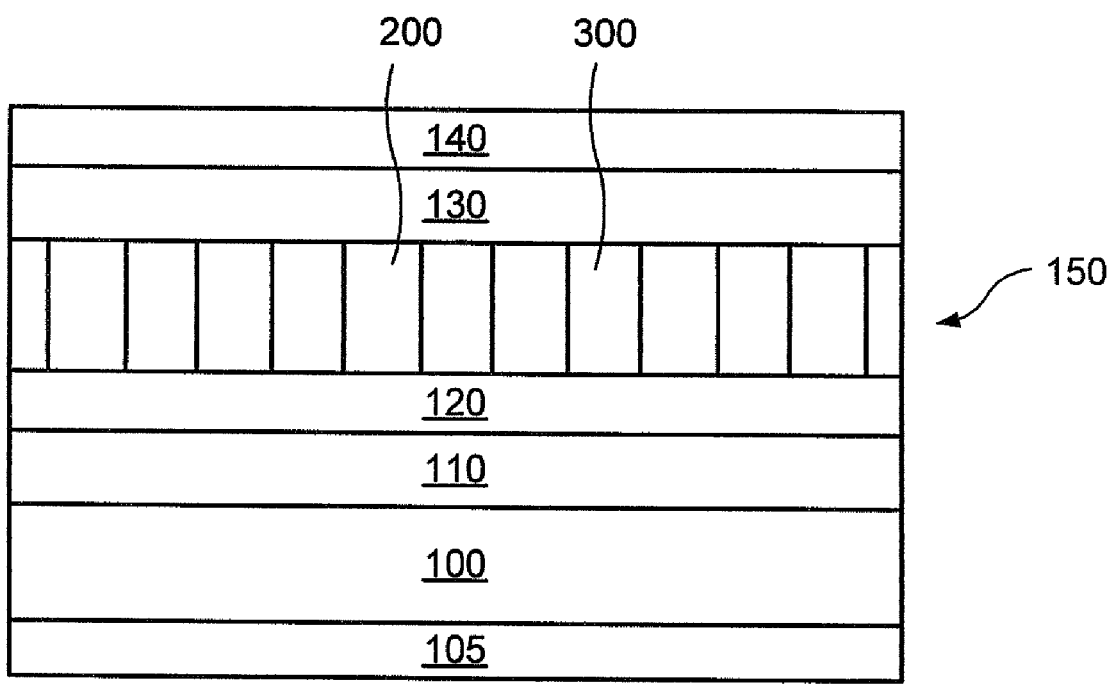
FIG. 6 illustrates a cross section of a device according to an aspect of the present invention.

Referring now to FIG. 6, there is shown a device 600 suitable for use as a universal broadband polarizing beamsplitter, polarizing beam combiner, and polarizer. Device 600 contains many of the elements shown and discussed with respect to device 500 of FIG. 5 above. Device 600 may further include a filler material 300 incorporated into the region between first index material 200. Material 300 may take the form of a low index material, for example. By way of non-limiting example only, material 300 may be used to provide mechanical stability to device 600, optical interfacing for device 600, such as by index matching, for example. Material 300 may take the form of a dielectric material, such as silicon dioxide, a polymer material or other materials known by those possessing an ordinary skill in the pertinent arts to substantially perform dielectric functions. Filler material 300 may include conductive material, as discussed hereinabove.

By way of specific non-limiting example, device 600 may include a substrate 100, such as glass, coated with a multiple, such as two, layers 110, which may form of an anti-reflection coating, such as a layer of $HFO_2$ and a layer of $SiO_2$ each having a thickness in the range of 20 nm to 300 nm. Additionally, an etch stop layer 120, such as $Al_2O_3$, having a thickness in the range of 10 nm to 50 nm may be placed substantially adjacent to layer 110. A nanograting 150 may be included substantially adjacent to layer 120 and distal to layer 110. Substantially surrounding nanograting 150 may be a protective layer 130, such as $Al_2O_3$, with a thickness in the range of 1 nm to 20 nm. A filler 210, such as $SiO_2$, may also be used in the alternating regions of nanograting 150, placed in an alternating manner with elements 200. An intermediate dielectric layer (not shown), such as $SiO_2$, may also be used. Such a layer may be applied with a thickness of 20 nm to 200 nm. This intermediate dielectric layer may protect adjacent layers during the fabrication process, or provide index matching, or other properties as would be known to those possessing an ordinary skill in the pertinent arts. Such an intermediate dielectric layer may be placed substantially between and adjacent to substrate 100 and nanograting 150. Other suitable location may similarly, as would be apparent to those possessing an ordinary skill in the pertinent arts, be used for this intermediate layer. A suitable anti-reflection coating 140 may also be added substantially adjacent to layer 130, as described hereinabove. Similarly, an anti-reflection coating 105 may be placed adjacent to substrate 100 distal to coating 110.

Figure 7:
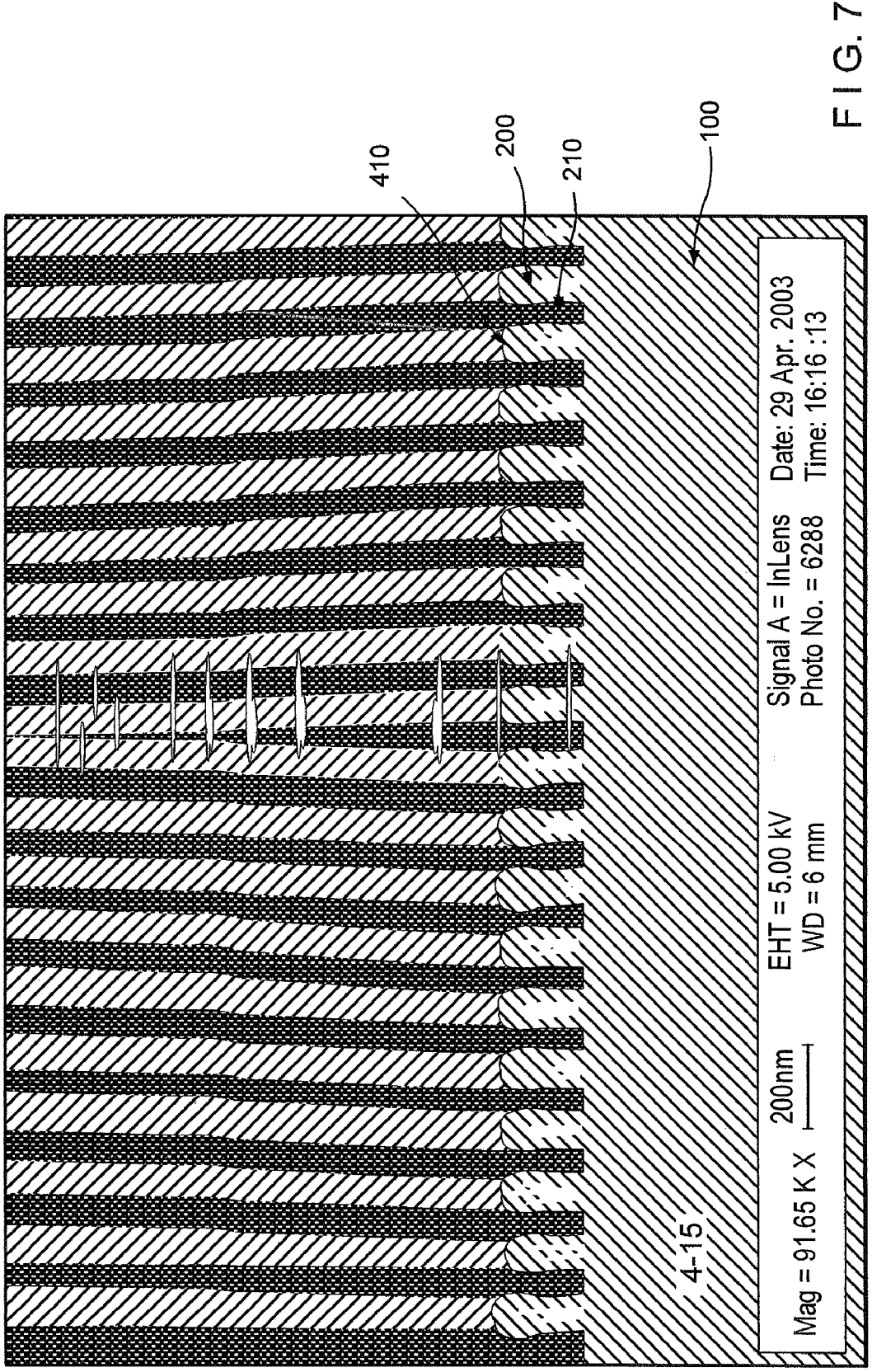
FIG. 7 illustrates an image of a device according to an aspect of the present invention.

Referring now to FIG. 7, there is shown an image 700 of a device according to an aspect of the present invention. As may be seen in FIG. 7, image 700 illustrates a substrate 100 comprising glass, a plurality of regions 150 including alternating first 200 and second 210 index materials, the plurality of regions 150 being positioned substantially adjacent to substrate 100, and a thin dielectric layer 410 positioned substantially adjacent to the plurality of regions 150 and distal to substrate 100. As may been seen in FIG. 7, image 700 was taken with a magnification of 91,650 (91K) and shows plurality of regions 150 having a period of approximately 150 nm.

While plurality of regions 150 described hereinabove illustrates two alternating materials forming a pattern, wherein a first material is designated as "A" and a second material is designated as "B", such as ABABAB . . . , other patterns may also be formed. The present invention may include other materials within the pattern making up plurality of regions 150. For example three alternating materials may be used creating a pattern such as ABCABCABC . . . . Further, four materials may be used producing a pattern ABCDABCD-ABCD . . . . Other numbers of materials may also be used producing patterns as described herein.

Figure 8:
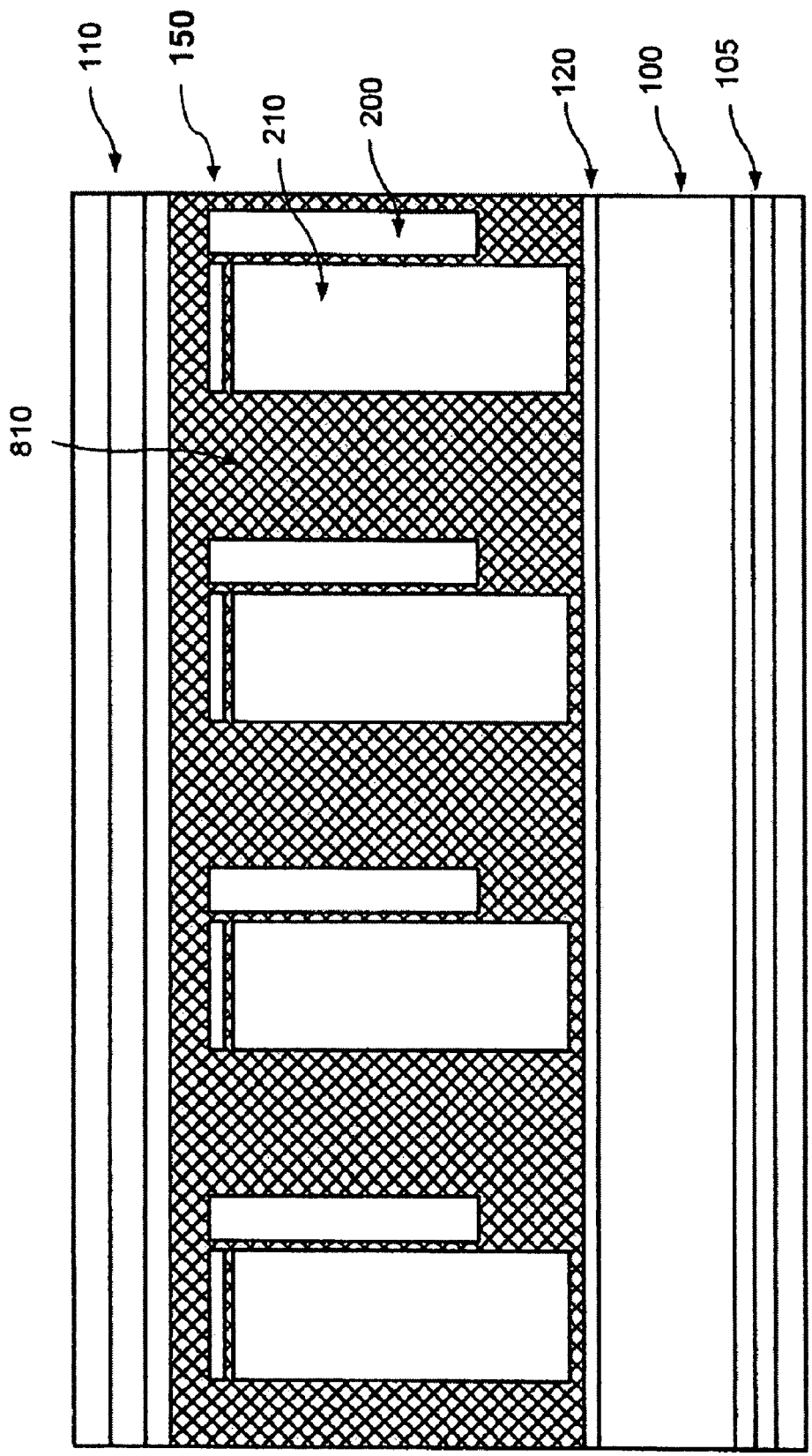
FIG. 8 illustrates a device according to an aspect of the present invention; and, FIG. 9 illustrates an image of a device according to an aspect of the present invention.

Referring now to FIG. 8, there is shown a device 800 according to an aspect of the present invention. As may be seen in FIG. 8, device 800 may include a substrate 100, an etch stop layer 120, plurality of regions 150 may include a plurality of filling material 810, a plurality of high index material 200, and a plurality of low index material 210, and anti-reflection coatings 105 and 110.

Similar to the devices discussed hereinabove, substrate 100 may include glass, semiconductor materials, Faraday magneto-optic materials, by way of non-limiting example only. Anti-reflection coatings 105 and 110 may be formed of alternating layers of $HFO_2$ and $SiO_2$. Similarly, etch stop layer 120 may be formed of $HFO_2$ and may also include materials to form anti-reflection coatings.

Plurality of regions 150 may include a plurality of filling material 810, a plurality of high index material 200, and a plurality of low index material 210 arranged in an alternating manner, such as filling material 810, plurality of low index material 210, and plurality of high index material 200, for example. According to an aspect of the present invention, filling material 810 may have a low or high index. Filling material having a low index may include $SiO_2$, as well as voids of air and vacuum. High index material 200 may include, as described hereinabove, metals, metal alloys, and combinations of metals. Metals suited for use as the high index material may include aluminum, gold, chromium, by way of non-limiting example only. Low index material 210 may include $SiO_2$, silicon nitride, and silicon, by way of non-limiting example only.

Figure 9:
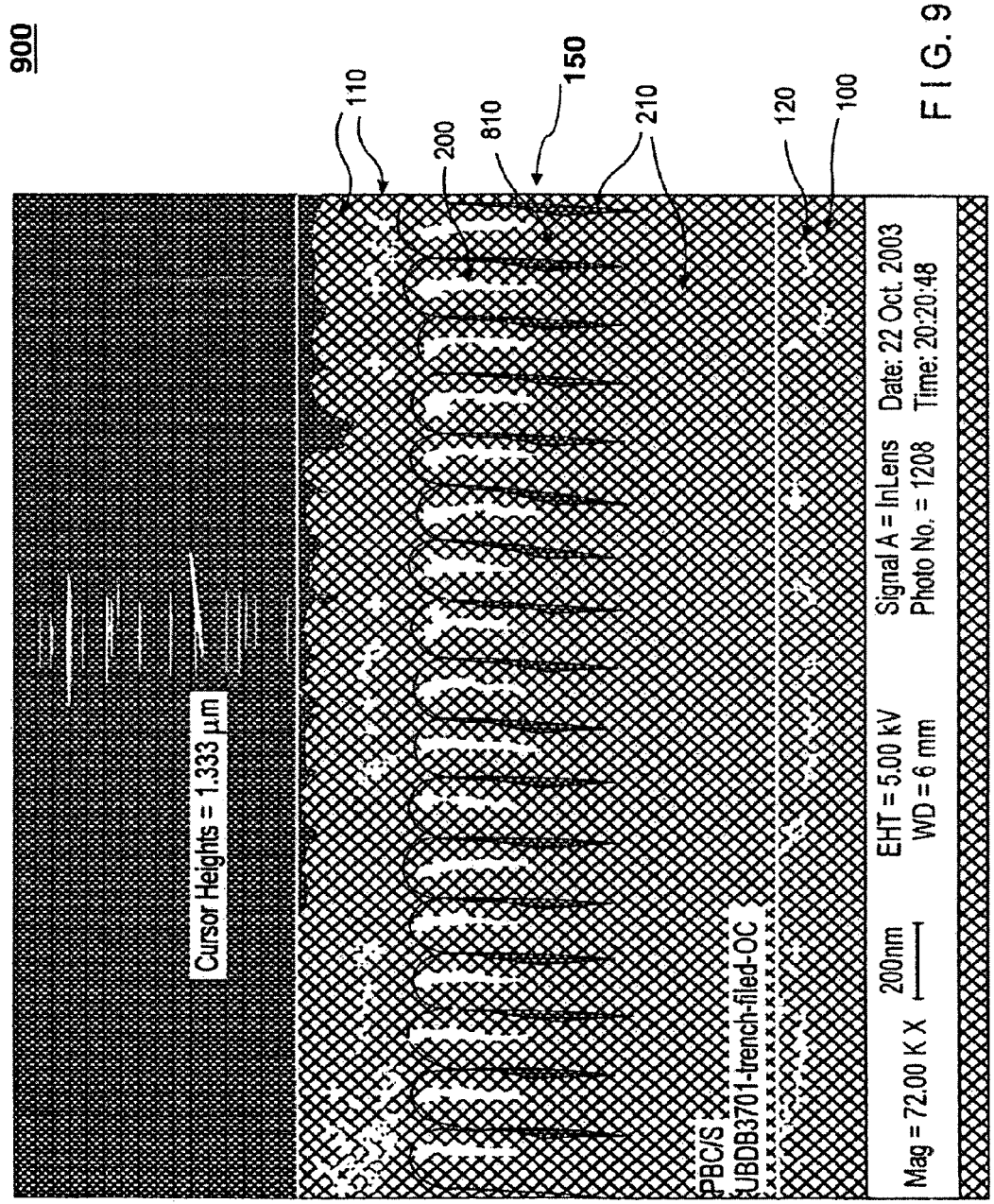

Referring now to FIG. 9, there is shown an image 900 of a device according to an aspect of the present invention. As may be seen in FIG. 9, image 900 shows a substrate 100 comprising glass, a plurality of regions 150 including alternating high 200 and low 210 index materials, plurality of filler 810, an etch stop layer 120, and anti-reflection coatings 105 and 110. Plurality of regions 150 may be positioned substantially adjacent to substrate 100 as shown. As may been seen in FIG. 9, image 900 was taken with a magnification of 72,000 and shows plurality of regions 150 having a period of approximately 200 nm.

Those of ordinary skill in the art will recognize that many modifications and variations of the present invention may be implemented without departing from the spirit or scope of the invention. Thus, it is intended that the present invention covers the modifications and variations of this invention provided they come within the scope of the appended claims and their equivalents.

What is claimed is:

1. A polarization dependent device, said device comprising:
    a substrate;
    a plurality of regions of differing refractive indices positioned in an alternating manner and substantially adjacent to said substrate, said plurality of regions comprising a plurality of spaced-apart strips of a first material extending along a common direction, each strip comprising a top surface distal from said substrate and a pair of sidewalls extending between the substrate and the top surface; and,
    a continuous dielectric layer conformally covering the top surface and sidewalls of the spaced-apart strips, where the dielectric layer has a uniform thickness in a range from 1 nm to 50 nm,
    wherein the polarization dependent device is a polarizer for incident light at at least one wavelength in a range from 300 nm to 1600 nm.

2. The device of claim 1, wherein said device effects the at least one polarization of broadband electromagnetic radiation incident upon the device by at least one of beamsplitting, beam combining, absorbing and reflecting the radiation at the at least one wavelength.

3. The device of claim 1, wherein said device has an extinction ratio greater than approximately 100 in transmission over a wavelength range of 390 nm to 1650 nm.

4. The device of claim 1, wherein said device has a transmittance greater than 0.50 over a wavelength range of 390 nm to 1650 nm.

5. The device of claim 1, further comprising at least one anti-reflection coating.

6. The device of claim 5, wherein said at least one anti-reflection coating enhances transmission at the at least one wavelength by reducing unwanted reflections.

7. The device of claim 1, wherein the conformal dielectric layer is a metal oxide.

8. The device of claim 1, wherein the conformal dielectric layer is silicon dioxide, silicon nitride, silicon oxynitride, or magnesium fluoride.

9. The device of claim 1, wherein the conformal dielectric layer is an organic polymer.

10. The device of claim 1, wherein the strips have a width in a range from about 10 nm to 500 nm.

11. The device of claim 1, wherein the strips have a width in a range from about 15 nm to 180 nm.

12. The device of claim 1, wherein the strips have a height in a range from about 10 nm to 1,000 nm.

13. The device of claim 1, wherein the strips have a height in a range from about 30 nm to 500 nm.

14. The device of claim 1, where the strips are arranged as a grating having a period in a range between about 10 nm and 1,000 nm.

15. The device of claim 1, where the strips are arranged as a grating having a period in a range between about 30 nm and 200 nm.

16. The device of claim 1, where the strips are arranged as a grating having a period that is constant or varied or chirped.

17. A polarization dependent device suitable for effecting at least one polarization of broadband electromagnetic radiation incident upon the device, said device comprising:
    a substrate;
    a plurality of regions of differing refractive indices positioned in an alternating manner and substantially adjacent to said substrate to effect the at least one polarization impinging on said regions, said plurality of regions comprising a plurality of spaced-apart strips of a first material extending along a common direction, each strip comprising a top surface distal from said substrate and a pair of sidewalls extending between the substrate and the top surface;
    at least one anti-reflection coating; and
    a continuous dielectric layer conformally covering the top surface and sidewalls of the spaced-apart strips, where the dielectric layer has a uniform thickness in a range from 1 nm to 50 nm regions; and,
    wherein said device has an extinction ratio greater than approximately 5000 in transmission over a wavelength range of 1250 nm to 1350 nm, and wherein said device has a transmittance greater than 0.96 over a wavelength range of 1250 nm to 1350 nm.

18. A polarization dependent device suitable for effecting at least one polarization of broadband electromagnetic radiation incident upon the device, said device comprising:
    a substrate;

a plurality of regions of differing refractive indices positioned in an alternating manner and substantially adjacent to said substrate to effect the at least one polarization impinging on said regions, said plurality of regions comprising a plurality of spaced-apart strips of a first material extending along a common direction, each strip comprising a top surface distal from said substrate and a pair of sidewalls extending between the substrate and the top surface;

at least one anti-reflection coating; and a continuous dielectric layer conformally covering the top surface and sidewalls of the spaced-apart strips, where the dielectric layer has a uniform thickness in a range from 1 nm to 50 nm, wherein said device has an extinction ratio greater than approximately 5000 in transmission over a wavelength range of 1450 nm to 1650 nm, and wherein said device has a transmittance greater than 0.96 over a wavelength range of 1450 nm to 1650 nm.

* * * * *